US006425931B1

(12) United States Patent
Croggon

(10) Patent No.: US 6,425,931 B1
(45) Date of Patent: Jul. 30, 2002

(54) CYCLONIC SEPARATION APPARATUS

(75) Inventor: James Hugh Croggon, Gloucestershire (GB)

(73) Assignee: Notetry Limited, Wiltshire (GB)

( * ) Notice: Subject to any disclaimer, the term of this patent is extended or adjusted under 35 U.S.C. 154(b) by 0 days.

(21) Appl. No.: 09/647,156

(22) PCT Filed: Mar. 22, 1999

(86) PCT No.: PCT/GB99/00894

§ 371 (c)(1),
(2), (4) Date: Nov. 30, 2000

(87) PCT Pub. No.: WO99/49978

PCT Pub. Date: Oct. 7, 1999

(30) Foreign Application Priority Data

Mar. 27, 1998 (GB) .............................................. 9806683

(51) Int. Cl.[7] ................................................ B01D 45/12
(52) U.S. Cl. ....................... 55/414; 55/459.1; 55/DIG. 3
(58) Field of Search ....................... 55/414, 416, 459.1, 55/459.2, 459.3, 459.4, 459.5, DIG. 3

(56) References Cited

U.S. PATENT DOCUMENTS

| | | | |
|---|---|---|---|
| 4,278,452 A | 7/1981 | Ido et al. | |
| 4,810,264 A | 3/1989 | Dewitz | |
| 5,444,982 A | 8/1995 | Heberling et al. | |
| 6,024,874 A * | 2/2000 | Lott | ........................... 209/138 |

FOREIGN PATENT DOCUMENTS

| | | |
|---|---|---|
| CH | 388 267 | 3/1961 |
| GB | 2 084 904 A | 5/1981 |
| WO | 91/06750 | 5/1991 |
| WO | 97/12660 | 4/1997 |
| WO | 97/46323 | 12/1997 |

* cited by examiner

*Primary Examiner*—Robert A. Hopkins
(74) *Attorney, Agent, or Firm*—Morrison & Foerster LLP

(57) ABSTRACT

The invention provides cyclonic separation apparatus containing a cyclone body having at least one fluid inlet and a fluid outlet, the fluid outlet being concentric with the longitudinal axis of the cyclone body. The cyclonic separation apparatus also contains a vortex finder projecting from an end surface of the cyclone body into the interior of the cyclonic separator, and a centerbody located partially within the vortex finder. The centerbody projects beyond the distal edge of the vortex finder so that the distance between the end surface of the cyclone body and the further end of the centerbody is at least twice the smallest diameter of the vortex finder, and the cross-sectional area of the centerbody is circular at any point along its length.

22 Claims, 5 Drawing Sheets

CYCLONIC SEPARATION APPARATUS

FIELD OF THE INVENTION

The invention relates to cyclonic separation apparatus, particularly but not exclusively to cyclonic separation apparatus for use in a vacuum cleaner.

BACKGROUND OF THE INVENTION

Cyclonic separation apparatus consists generally of a frusto-conical cyclone body having a tangential inlet at its larger, usually upper, end and a cone opening at its smaller, usually lower, end. A fluid carrying particles entrained within it enters via the tangential inlet and follows a helical path around the cyclone body. The particles are separated out from the fluid during this motion and are carried or dropped through the cone opening into a collector from which they can be disposed of as appropriate. The cleaned fluid, usually air, travels towards the central axis of the cyclone body to form a vortex and exits the cyclonic separator via a vortex finder which is positioned at the larger (upper) end of the cyclone body and is aligned with the central axis thereof.

The vortex finder usually takes the form of a simple tube extending downwardly into the cyclone body so that the vortex of exiting fluid is reliably directed out of the cyclone. However, the vortex finder has a number of inherent disadvantages. One of these disadvantages is the fact that there is a significant pressure drop within the vortex finder due to the high angular velocity of the exiting fluid. In an attempt to overcome this problem, centerbodies have been introduced into known vortex finders in combination with tangential offtakes in order to straighten the flow passing through and out of the cyclone. Some attempts have been made to reduce the swirl of the flow using fixed vanes. A variety of these attempts are illustrated in the paper entitled "The use of tangential offtakes for energy savings in process industries" (T O'Doherty, M Biffin, N Syred: Journal of Process Mechanical Engineering 1992, Vol 206). Other arrangements incorporating centerbodies or vanes are illustrated in WO 97/46323, WO 91/06750 and U.S. Pat. No. 5,444,982. In all of these pieces of prior art, the centerbody is wholly contained within the vortex finder or, if it is not, it projects only to a very minor extent into the cyclone body. This is because the single aim of the centerbody or vane is to remove the swirl from the flow within the vortex finder, rather than to stabilize it.

Centerbodies have also been introduced to cyclonic separators for other reasons. One such reason, illustrated in U.S. Pat. No. 4,278,452, is to expand the outgoing fluid so that an outermost annulus of fluid containing any particles remaining entrained is recirculated through the separator. However, by necessity, the major part of the centerbody must remain outside the vortex finder and therefore is incapable of stabilizing the fluid flow inside the vortex finder. Another use of a centerbody is to support an electrode by means of which a Corona discharge is produced within the separation zone of the separator. This enhances the separation efficiency within the separation zone but, because the electrode must incorporate angular or pointed areas from which the Corona will discharge, there can be no stabilization of the exiting fluid.

In CH 388267, use is made of a centerbody projecting out of a vortex finder to prevent bubbles of gas escaping from the main outlet of apparatus for separating solid particles and gas bubbles from a liquid suspension. The centerbody has an essentially flat end. The gas bubbles, which migrate to the vortex core during operation, are caused to exit the apparatus via the cone opening, which forms an outlet for the cyclone.

Another problem associated with vortex finders is the fact that, during operation of the cyclonic separation apparatus, the vortex core precesses around the interior of the vortex finder causing a significant amount of noise. The provision of a centerbody wholly within the vortex finder has been recognized as contributing to the reduction of the noise associated with the exiting fluid to a certain extent but no attempt has been made to make use of a centerbody to reduce the noise still further.

SUMMARY OF THE INVENTION

In domestic appliances such as vacuum cleaners, noise is always undesirable and there is an ongoing desire to reduce the noise associated with the appliance as far as possible. It is therefore an object of the present invention to provide cyclonic separation apparatus, suitable for incorporation into a domestic appliance, in which the noise level is improved. It is a further object of the invention to provide cyclonic separation apparatus in which the pressure drop appearing across the vortex finder is as small as possible. It is a still further object of the invention to provide cyclonic separation apparatus suitable for use in a domestic vacuum cleaner.

The invention provides cyclonic separation apparatus containing a cyclone body having at least one fluid inlet and a fluid outlet having a vortex finder. The invention also provides a vacuum cleaner incorporating such cyclonic separation apparatus. Further and preferred features of the cyclonic separation apparatus include a centerbody having a circular cross-section and a hemispherical, conical or frusto-conical end which protrudes beyond the lowermost end of the vortex finder to a distance at which the furthermost end of the centerbody is at least twice the smallest diameter of the vortex finder from the end surface of the cyclone body reduces the noise associated with the exiting vortex to an appreciable degree. The reduction has been found to be significantly better than in the case when the vortex finder does not protrude out of the vortex finder to any significant extent. It is believed that precession of the vortex core when bounded by the walls of the vortex finder causes pressure perturbations within the airflow which are manifested as noise. Hence it is desirable to stabilize this rotation completely before the exiting air enters the vortex finder. The extension of the centerbody into the core's low pressure area before it reaches the vortex finder causes the core to stabilize before it reaches the vortex finder. The noise level is thereby reduced. Experimentation with specific apparatus has shown that, for specific dimensions of cyclone, vortex finder and centerbody, there are optimum distances from the upper surface of the cyclone to which the centerbody must extend. It will be clear from the description and examples which follow that it is not necessary for the centerbody to extend all the way up the vortex finder to the upper surface of the cyclone.

BRIEF DESCRIPTION OF THE DRAWINGS

Embodiments of the invention will now be described with reference to the accompanying drawings, wherein.

DETAILED DESCRIPTION OF THE INVENTION

Figure 1:
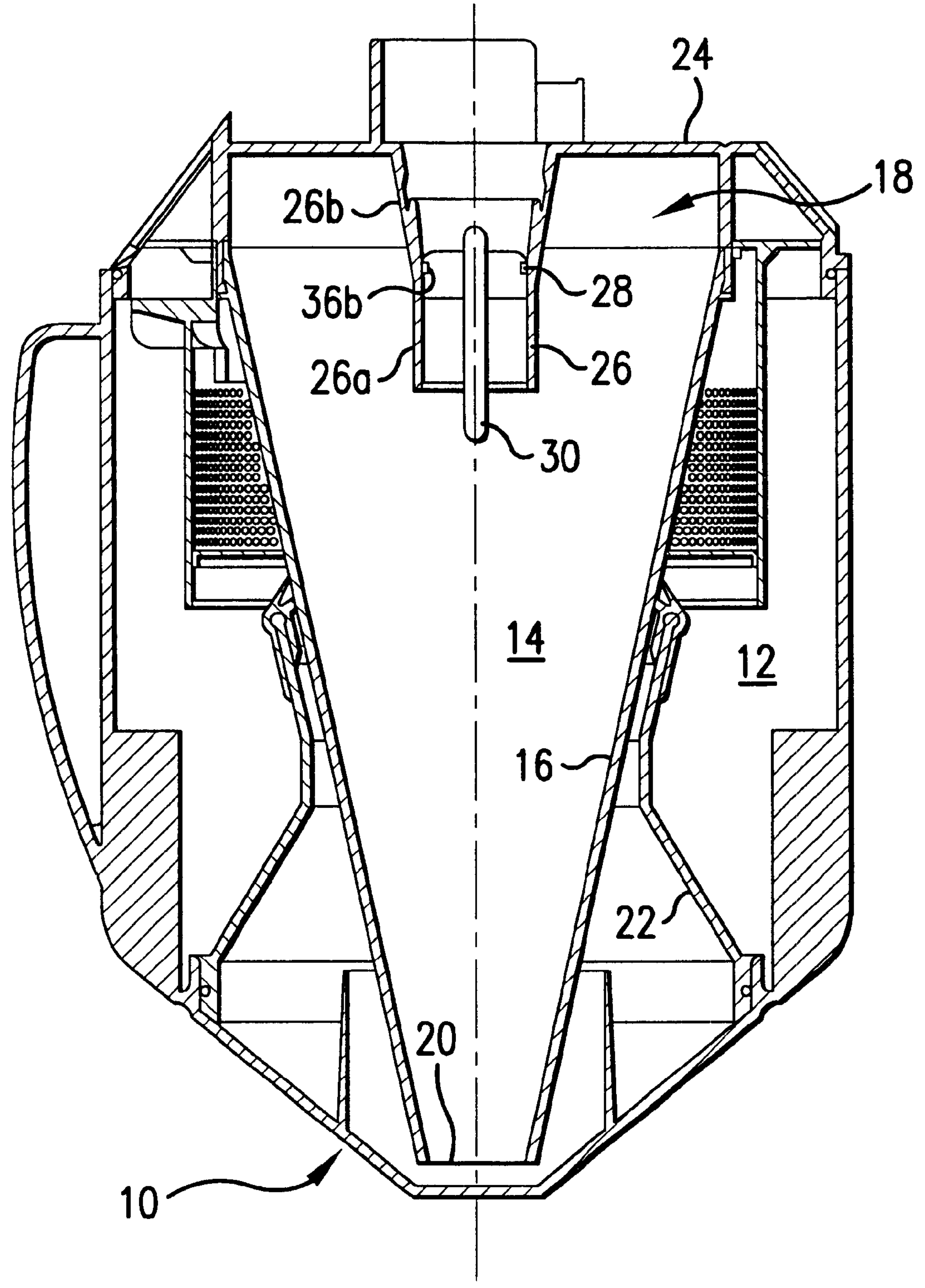
FIG. 1 shows, in cross section, cyclonic separation apparatus according to the present invention and suitable for use in a vacuum cleaner.

FIG. 1 shows cyclonic separation apparatus 10 suitable for use in a cyclonic vacuum cleaner. In fact, in this example, the cyclonic separation apparatus consists of two concentric cyclones 12,14 for sequential cleaning of an airflow. The remaining features of the vacuum cleaner (such as the cleaner head or hose, the motor, motor filters, handle, supporting wheels, etc.) are not shown in the drawing because they do not form part of the present invention and will not be described any further here. Indeed, it is only the innermost, high efficiency cyclone 14 which incorporates a vortex finder in this embodiment and therefore it is only the innermost cyclone 14 which is of interest in the context of this invention. It will, however, be understood that the invention is applicable to cyclonic separation apparatus other than that which is suitable for use in vacuum cleaners and also to cyclonic separation apparatus incorporating only a single cyclone.

The innermost cyclone 14 comprise a cyclone body 16 which is generally frusto-conical in shape and has a fluid inlet 18 at its upper end and a cone opening 20 at its lower end. The cone opening 20 is surrounded by a closed collection chamber 22 in which particles entering the cyclone 14 via the fluid inlet 18 and separated from the airflow within the cyclone body 16 are collected. The cyclone body 16 has an upper surface 24 in the centre of which is located a vortex finder 26. The vortex finder is generally tubular in shape and has a lower cylindrical portion 26*a* which merges into an upper frusto-conical portion 26*b* which leads out of the cyclone body 16 to an exit conduit. The operation of cyclonic separation apparatus of the type described thus far is well known and documented elsewhere and will not be described in any further detail here.

Figure 2A:
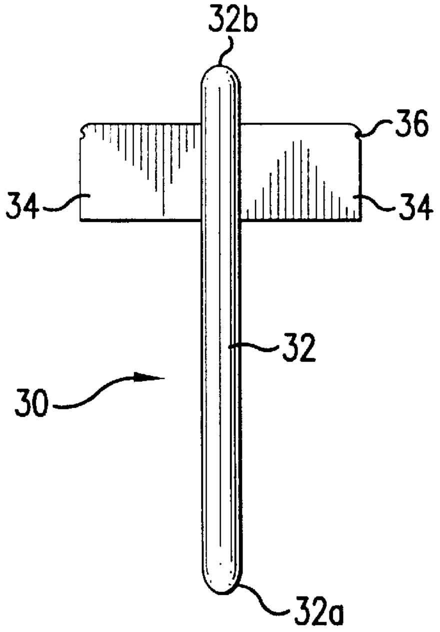
FIG. 2*a* shows, to a larger scale, the centerbody forming part of the apparatus shown in FIG. 1.

The invention takes the form of a vortex finder centerbody 30 which is located inside the vortex finder 26 and is shown in position in FIG. 1. The centerbody 30 is also shown on an enlarged scale in FIG. 2*a*. The centerbody 30 comprises a central elongate member 32 which is cylindrical along the majority of its length and has hemispherical ends 32*a*, 32*b*. The hemispherical shaping of the ends 32*a*, 32*b* reduces the risk of turbulence being introduced to the airflow as a result of the presence of the centerbody 30. The elongate member 32 carries two diametrically opposed tabs 34 which are generally rectangular in shape and extend radially outwardly from the elongate member 32 sufficiently far to abut against the interior walls of the vortex finder 26 within the cylindrical portion 26*a*. The downstream edges of the tabs 34 have radiussed outer corners to reduce the risk of turbulence being introduced. Also, notches or grooves 36*a* are formed in the outer edges of the tabs 34 whilst corresponding tongues or projections 36*b* are formed in the interior walls of the cylindrical portion 26*a* of the vortex finder 26. The tongues or projections 36b are also diametrically opposed and are designed and positioned to cooperate with the notches or grooves 36*a* in the tabs 34 and so hold the centerbody 30 in position in the vortex finder 26. It will be understood that the exact method of holding the centerbody in position is immaterial to the invention and the notches/grooves 36*a* and tongues/projections 36*b* can be replaced by any alternative suitable means for reliably holding the centerbody 30 within the vortex finder 26 so that the centerbody 30 will not be dislodged by the likely rate of flow of fluid through the cyclonic separation apparatus, nor subjected to unacceptable vibrations. A snap fitting method is regarded as particularly desirable because of its ease of manufacture and ease of use.

The length of the centerbody 30 and its positioning are sufficient to ensure that the end 32*a* of the centerbody 30 furthest from the upper surface 24 lies at a point whose distance below the upper surface 24 is equal to at least twice the smallest diameter of the vortex finder 26. Thus the length of the protrusion of the centerbody 30 beyond the lower end of the vortex finder 26 added to the total length of the vortex finder 26 (below the upper surface 24) must be at least twice the diameter of the vortex finder 26. If this criterion is satisfied, the noise reduction achievable is improved. In the embodiment shown in FIG. 1, the lowermost point of the centerbody 30 lies below the upper surface 24 at a distance which is equal to approximately 2.58 times the smallest diameter of the vortex finder 26. Specifically, the lowermost point of the centerbody 30 lies 82.5 mm below the upper surface 24 and the smallest diameter of the vortex finder 26 is 32 mm. Furthermore, the length of the centerbody 30 is 60 mm and its diameter is 6 mm. The centerbody 30 projects below the lowermost edge of the vortex finder 26 to a distance of 16.5 mm. This arrangement succeeds in achieving a reduction in overall sound pressure level (noise) emitted from the whole vacuum cleaner product of 1.5 dBA.

Figure 2B:
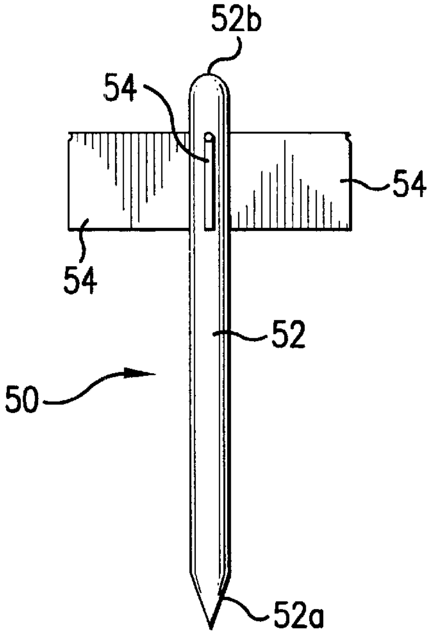
FIG. 2*b* shows a first alternative configuration of the centerbody of FIG. 2*a;*

In order for the centerbody 30 to function well, the cross-section of the centerbody 30 is made circular at any point along its length. The main body of the centerbody 30 is cylindrical, as mentioned above, but the upstream and downstream ends 32*a*, 32*b* can take various shapes. In the embodiment shown in FIG. 2*a*, both of the ends 32*a*, 32*b* are hemispherical. However, one or other of the ends could be, for example, conical or frusto-conical, although a conical end will be preferable because this will reduce pressure drop and/or energy losses within the apparatus. An alternative centerbody 50 is shown in FIG. 2*b* in which the central portion of the elongate body 52 of the centerbody 50 is again cylindrical and the downstream end 52*b* is hemispherical, but the upstream end 52*a* is conical in shape. A further difference between the centerbody 50 shown in FIG. 2*a* and the alternative centerbody shown in FIG. 2*b* is the number of tabs 54 provided on the elongate body 52 for support purposes. In the embodiment shown in FIG. 2*b*, four equi-angularly spaced tabs 54 are provided. Corresonding tongues are then provided on the wall of the vortex finder 26 in order to support the centerbody 50 therein.

Figure 2C:
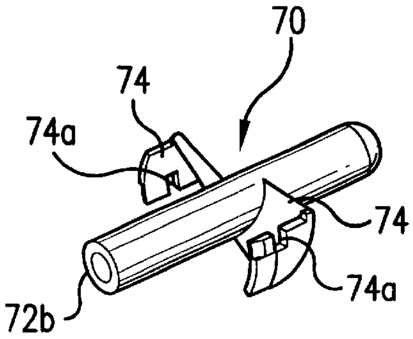
FIG. 2*c* shows a second alternative configuration of the centerbody of FIG. 2*a;*
Figure 2D:
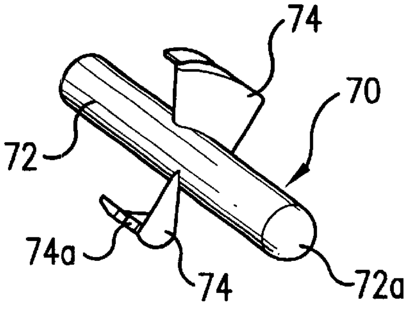
FIG. 2*d* shows a second alternative configuration of the centerbody of FIG. 2*a*.

A further alternative embodiment is shown from two different angles in FIG. 2*c*. In the Figure, the centerbody 70 is shown from two different perspective views so that the helical shape of the tabs 74 can clearly be seen. The helical shape is present so that the tabs 74 do not interfere with the rotational motion of the air exiting via the vortex finder. As in the embodiment shown in FIG. 2*a*, the elongate body 72 is generally cylindrical in shape and the upstream end 72*a* is hemispherical. The downstream end 72*b* is planar. Each tab 74 is shaped at its distal end so as to include grooves 74*a* which cooperate with projections moulded into the vortex finder so that the centerbody 70 is held firmly in the correct position in the vortex finder.

Figure 3:
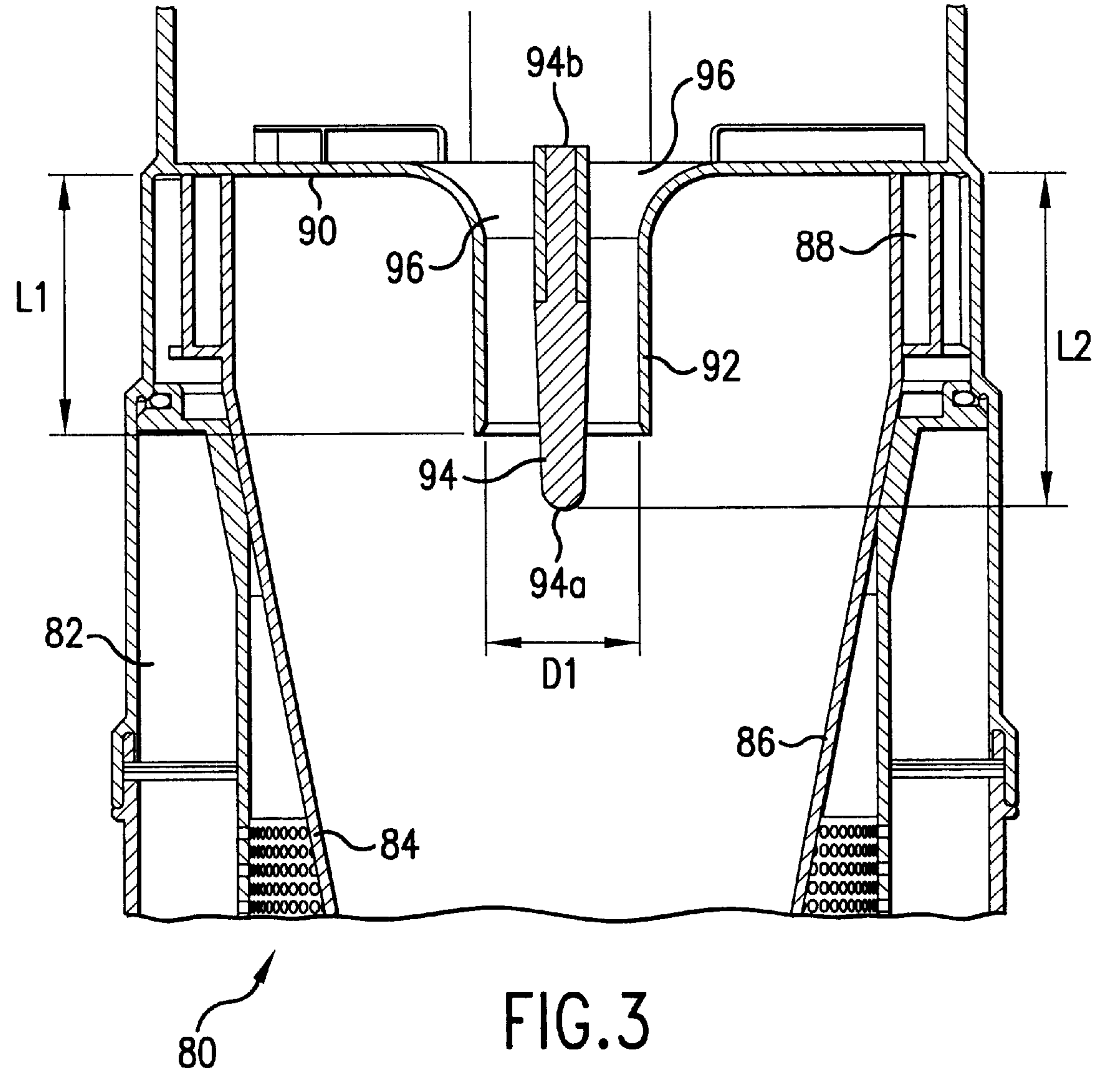
FIG. 3 is a cross-section through part of alternative cyclonic separation apparatus according to the present invention.

An alternative configuration of separation apparatus is shown in part in FIG. 3. The figure shows only the upper portion of the separation apparatus 80 which, as before, comprises an upstream, low-efficiency cyclone 82 and a downstream, high-efficiency cyclone 84. The low-efficiency cyclone 84 has a cyclone body 86 which has an inlet 88 communicating with the upper end of the cyclone 84 and a cone opening (not shown) at the opposite end thereof surrounded by a collector (also not shown) in the same manner as shown in FIG. 1. The cyclone 84 is closed at its upper end by an upper surface 90 from which depends a vortex finder 92 which extends into the interior of the cyclone 84 along a central axis thereof. The vortex finder 92 is cylindrical in shape for the majority of its length but flares outwardly at its upper end so as to merge smoothly with the upper surface 90.

A centerbody 94 is immovably mounted within the vortex finder 92 and extends from a point above the level of the upper surface 90 right through the vortex finder 92 so that the centerbody 94 projects beyond the lower edge of the vortex finder 92. The body of the centerbody 94 is generally cylindrical with a slight taper towards the upstream end 94*b*. The upstream end 94*a* is hemispherical in shape but its downstream end 94*b* is merely planar. The centerbody 94 has three equiangularly spaced tabs or flanges 96 which extend outwardly from the upper end of the centerbody 94 to the inner wall of the vortex finder 92. The outermost edges of the tabs or flanges 96 are shaped so as to follow the shape of the inner wall of the vortex finder 92 to assist with correct positioning of the centerbody 94.

In this embodiment, the diameter of the centerbody 94 is 10 mm and the diameter D1 of the vortex finder 92 is 30.3 mm. The length L1 of the vortex finder is 50 mm and the distance L2 between the lower end 94*a* of the centerbody 94 and the upper surface 90 is 64.4 mm. Hence the lowermost point of the centerbody 94 lies below the upper surface 90 at a distance of 2.13 times the (smallest) diameter of the vortex finder 92. The centerbody 94 projects below the vortex finder 92 to a distance of 14.4 mm.

This invention will be better understood with reference to the following examples which are intended to illustrate specific embodiments within the overall scope of the invention as claimed.

Figure 4:
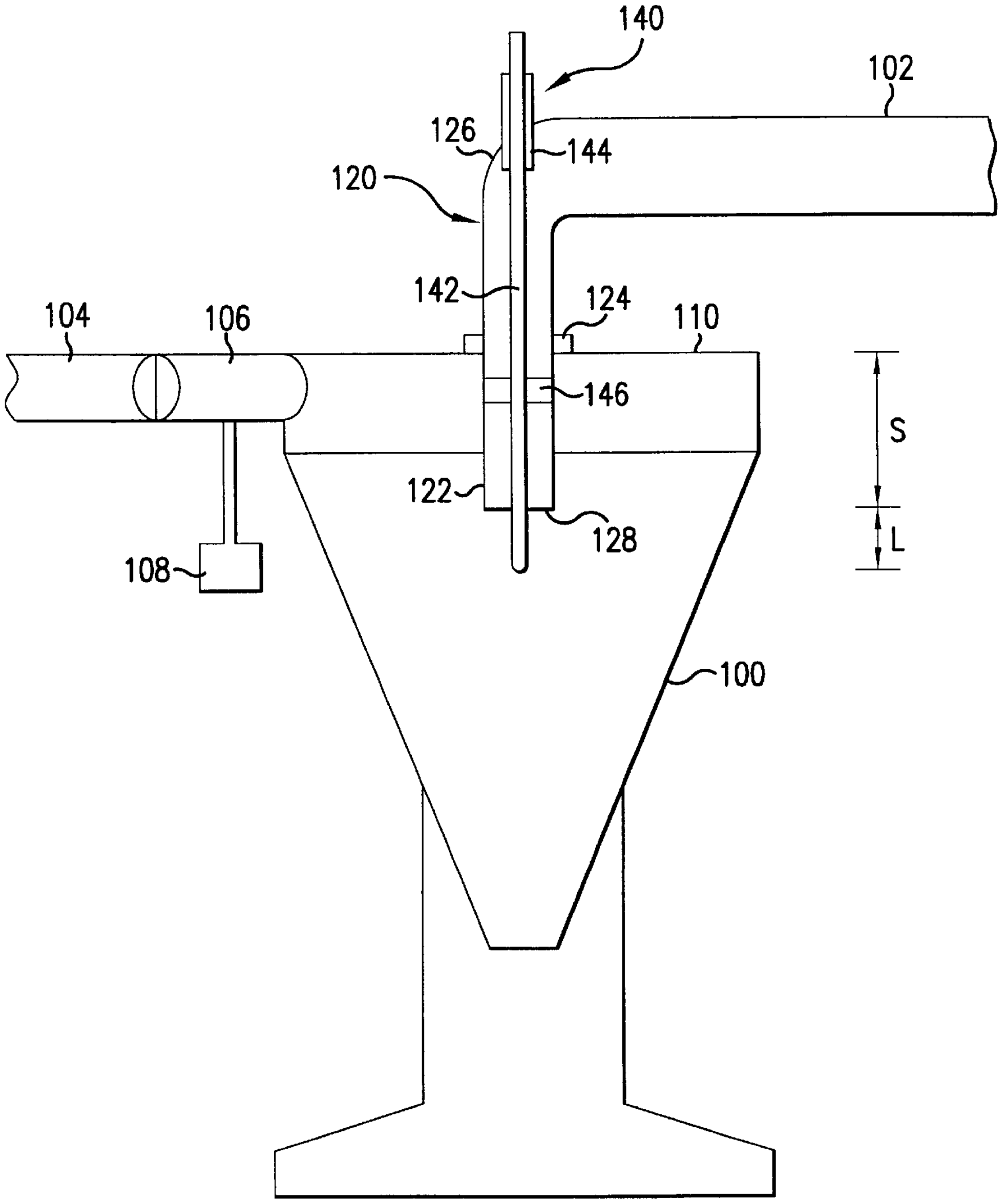
FIG. 4 is a schematic drawing of the test apparatus used to determine the results of the experiments described below.

Tests to determine the optimum position of the lowermost end of the centerbody in the apparatus shown in FIG. 1 have been carried out. The test method and apparatus will now be described with reference to FIG. 4 of the accompanying drawings.

A clear cyclone 100 with a variable-length vortex finder 120 and a variable-length centerbody 140 was mounted in an upright position using appropriate clamps and mounting devices (not shown). The cyclone 100 had a maximum diameter of 140 mm and a height of 360 mm. Suction was provided to the cyclone 100 by a quiet source connected via a first flexible hose 102 to ensure the minimum of interference from motor noise. A second flexible hose 104 connected to the cyclone inlet 106 took incoming air from a remote chamber (not shown) to avoid interference from the noise associated with air entering the hose opening. At the inlet 106 to the cyclone 100 a flow rate meter 108 was attached to allow the incoming flow rate to be measured accurately.

The variable-length vortex finder 120 consisted of a tube 122 of fixed length and fixed. diameter connected to the first flexible hose 102 and slidably mounted in the upper plate 110 of the cyclone 100 by means of a sealing and clamping ring 124. In this case, the diameter of the tube was 32 mm. By clamping the tube 122 at different positions so that it projected into the cyclone 100 by different amounts, the length S of the vortex finder 120 could be varied. The variable-length centerbody 140 consisted of an elongate member 142 mounted in a knee 126 in the upper end of the vortex finder 120. The elongate member 142 was slidably mounted in the knee 126 by means of a sealing and clamping block 144. Further support was provided to the elongate member 142 by way of two tabs 146 extending from the elongate member 142 to the interior wall of the vortex finder 122. The tabs 146 prevented the elongate member 142 from oscillating during the test procedure. By clamping the elongate member 142 so that it projected beyond the lower end 128 of the tube 122 by different amounts, the length L of the centerbody 140 could be varied.

In order to perform the experiment, the vortex finder length S was set to the required value and the end of the elongate member 142 was set flush with the lower end 128 of the tube 122 (ie, L=0). The suction source was activated and the flow rate measured and set to the required level by appropriate adjustment The centerbody 140 was then moved down in 5 mm stages and sound measurements taken at each stage. The optimum length of the centerbody being sought was the length at which the noise level was reduced to a minimum. When an approximate location of the optimum length of the centerbody 140 had been located 2 mm increments in centerbody length L were then used to pinpoint more accurately the optimum length.

Having determined the optimum length of the centerbody 140 for a given flowrate and a given vortex finder length S, the flowrate was then varied by adjusting the suction source and the incremental variation of the centerbody length L was repeated to determine the optimum centerbody length for that flowrate. Having determined the optimum centerbody length for each required flowrate and a given vortex finder length, the vortex finder length was then adjusted and a second series of experiments were carried out using the same set of flowrates to produce comparable results. The results obtained are set out below.

| Flow Rate (liters/second) | Vortex Finder Length S (mm) | Optimum Centerbody Length L (mm) |
|---|---|---|
| 20 | 66 | 20 |
| 22.5 | 66 | 22 |
| 25 | 66 | 23 |
| 20 | 40 | 45 |
| 22.5 | 40 | 55 |
| 25 | 40 | 49 |
| 20 | 80 | 10 |
| 22.5 | 80 | 6 |
| 25 | 80 | 25 |

The optimum length was further defined as being the length of the centerbody at which noise reduction reversed to a slight gain in noise level. The optimum length was therefore seen as a minimum overall sound pressure level, a point where no significant reduction is gained by continuing to extend the centerbody or a point where the tonal quality starts to deteriorate. In particular the fundamental frequency, identified using narrow band analysis, of the vortex precession was considered as being at its minimum at the optimum length.

Further tests revealed that, in a cyclone body having diameter of 140 mm, a height of 300 mm, a vortex finder diameter of 32 mm and a vortex finder length of 66 mm, the optimum protrusion of the centerbody 30 beyond the lowermost end of the vortex finder is 16.5 mm. This gives a distance between the lowermost end of the centerbody 30 and the upper surface 24 of 82.5 mm, which is 2.58 times the diameter of the vortex finder 26.

Further tests were carried out using apparatus similar to that described above but with replaceable vortex finders having different diameters. In each case, the vortex finder length was 46 mm and a fixed flow rate of 27 litres/second was used. The centerbody used was similar to that described above but had a diameter of 10 mm. A method similar to that described above was used to find the optimum centerbody length for each vortex finder diameter. The results obtained are as follows:

| Vortex Finder Diameter D1 (mm) | Optimum Centerbody Length L1 (mm) |
|---|---|
| 38 | 85 |
| 34 | 88 |
| 30 | 76 |
| 28 | 64 |
| 26 | 61 |

This clearly shows that the optimum centerbody length for a given flow rate and a given centerbody diameter decreases generally with the diameter of the vortex finder.

The centerbody 30 is preferably made from a plastics material and must be sufficiently rigid not to bend or oscillate when exposed to the flowrates likely to be passed through the separation apparatus. For a centerbody suitable for use in a vacuum cleaner, a suitable material is polypropylene and this allows the centerbody to be moulded simply and economically using any one of a variety of common techniques, for example, injection moulding.

Figure 5:
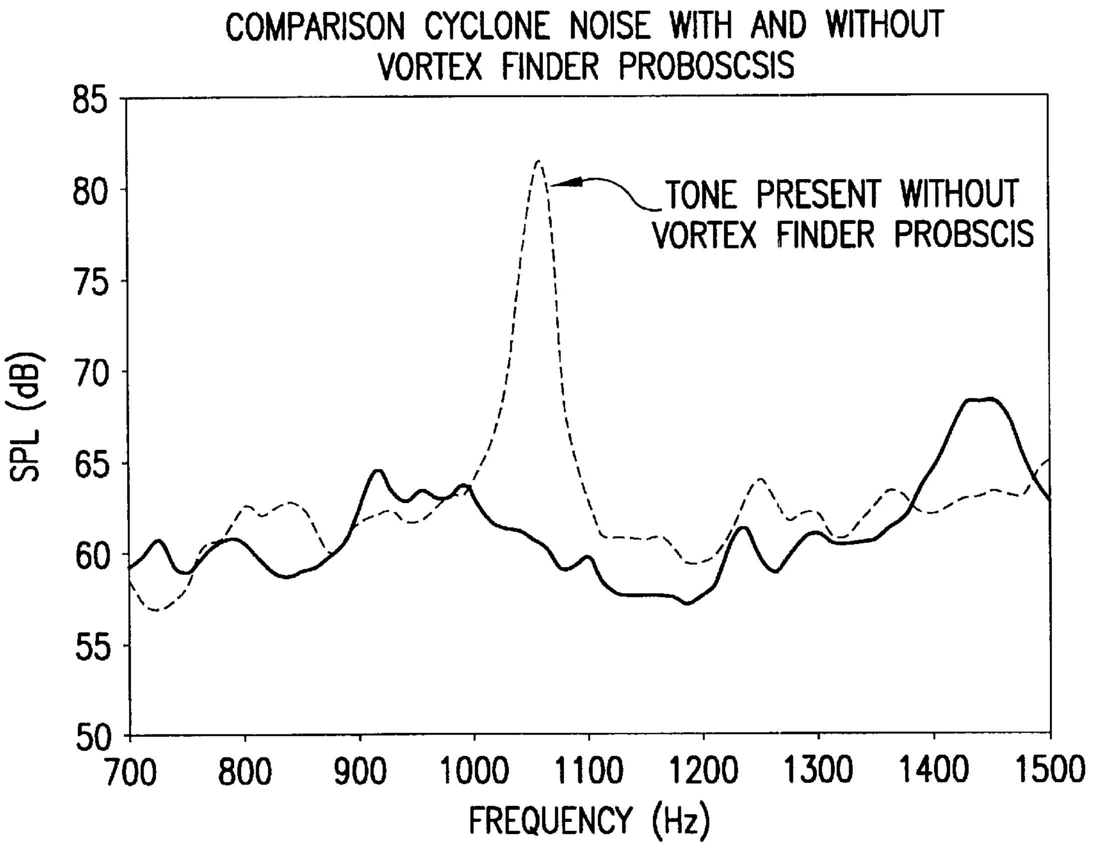
FIG. 5 is a graph showing a comparison in cyclone noise with and without an optimised vortex finder centerbody in place.

Testing and research have shown that, depending upon the specific configuration of the cyclone, optimising the centerbody length can result in a reduction of between 2 and 6 dB of the overall sound pressure level of a cyclone. This is sufficient to achieve an audible difference in the overall noise levels of a domestic vacuum cleaner. FIG. 5 illustrates the difference in noise (sound pressure level) produced by the cyclone of a specific vacuum cleaner with and without an optimised centerbody in place. As can clearly be seen, the presence of the centerbody (noise level shown in bold lines) removes a significant tone which is present when the centerbody is absent (noise level shown in dotted lines). The advantages of reducing the noise level of a domestic vacuum cleaner are to improve consumer satisfaction and allow a user to hear other sounds and noises within the environment in which the cleaner is being used. This can improve the safety of the user when using the cleaner.

What is claimed is:

1. A cyclonic separation apparatus comprising a cyclone body having at least one fluid inlet and a fluid outlet, the fluid outlet being concentric with a longitudinal axis of the cyclone body and comprising a vortex finder projecting from an end surface of the cyclone body into the interior thereof, and a centerbody located partially within the vortex finder and projecting beyond the end thereof opposite the end surface so that the distance between the end surface of the cyclone body and the furthermost end of the centerbody is at least twice the smallest diameter of the vortex finder, the cross-sectional area of the centerbody being circular at any point along its length, wherein the centerbody tapers inwardly towards its furthermost end and is hemispherical, conical or frusto-conical in shape.

2. A cyclonic separation apparatus as claimed in claim 1, wherein the distance between the end surface of the cyclone body and the furthermost end of the centerbody is at least 2.3 times the smallest diameter of the vortex finder.

3. A cyclonic separation apparatus as claimed in claim 2, wherein the distance between the end surface of the cyclone body and the furthermost end of the centerbody is at least 2.5 times the smallest diameter of the vortex finder.

4. A cyclonic separation apparatus as claimed in claim 1, wherein the centerbody is generally cylindrical with at least one hemispherical end.

5. A cyclonic separation apparatus as claimed in claim 1; wherein the centerbody is generally cylindrical with at least one conical end.

6. A cyclonic separation apparatus as claimed in claim 1, wherein the diameter of the centerbody is no more than one half of the smallest diameter of the vortex finder.

7. A cyclonic separation apparatus as claimed in claim 6, wherein the diameter of the centerbody is no more than one third of the smallest diameter of the vortex finder.

8. A cyclonic separation apparatus as claimed in claim 7, wherein the smallest diameter of the vortex finder is about 32 mm and the diameter of the centerbody is about 6 mm.

9. A cyclonic separation apparatus as claimed in claim 8, wherein the distance of the furthermost end of the centerbody is between 80 mm and 110 mm from the end surface of the cyclone body.

10. A cyclonic separation apparatus as claimed in claim 9, wherein the distance of the furthermost end of the centerbody is between 85 mm and 95 mm from the end surface of the cyclone body.

11. A cyclonic separation apparatus as claimed in claim 7, wherein the smallest diameter of the vortex finder is about 30 mm and the diameter of the centerbody is about 10 mm.

12. A cyclonic separation apparatus as claimed in claim 11, wherein the distance of the furthermost end of the centerbody is between 50 mm and 90 mm from the end surface of the cyclone body.

13. A cyclonic separation apparatus as claimed in claim 12, wherein the distance of the furthermost end of the centerbody is between 60 mm and 70 mm from the end surface of the cyclone body.

14. A cyclonic separation apparatus as claimed in claim 1, wherein the centerbody projects beyond a lower edge of the vortex finder to a distance of at least 10 mm.

15. A cyclonic separation apparatus as claimed in claim 14, wherein the centerbody projects beyond the lower edge of the vortex finder to a distance of about 14.4 mm.

16. A cyclonic separation apparatus as claimed in claim 14, wherein the centerbody projects beyond the lower edge of the vortex finder to a distance of about 16.5 mm.

17. A cyclonic separation apparatus as claimed in claim 1, wherein the centerbody is supported in the vortex finder by supporting tabs extending as far as an interior wall of the vortex finder.

18. A cyclonic separation apparatus as claimed in claim 17, wherein the tabs are diametrically opposed.

19. A cyclonic separation apparatus as claimed in claim 17, wherein the tabs comprise helical vanes.

20. A cyclonic separation apparatus as claimed in claim 17, wherein the tabs and the interior wall of the vortex finder incorporate retaining means for retaining the centerbody in position inside the vortex finder.

21. A cyclonic separation apparatus as claimed in claim 20, wherein the retaining means comprises resilient tongues engageable with corresponding grooves.

22. A vacuum cleaner incorporating a cyclonic separation apparatus comprising a cyclone body having at least one fluid inlet and a fluid outlet, the fluid outlet being concentric with a longitudinal axis of the cyclone body and comprising a vortex finder projecting from an end surface of the cyclone body into the interior thereof, and a centerbody located partially within the vortex finder and projecting beyond the end thereof opposite the end surface so that the distance between the end surface of the cyclone body and the furthermost end of the centerbody is at least twice the smallest diameter of the vortex finder, the cross-sectional area of the centerbody being circular at any point along its length, wherein the centerbody tapers inwardly towards its furthermost end and is hemispherical, conical or frusto-conical in shape.

* * * * *